United States Patent
Bjerre et al.

(10) Patent No.: US 11,823,487 B2
(45) Date of Patent: Nov. 21, 2023

(54) METHOD AND SYSTEM FOR ENROLLING A FINGERPRINT

(71) Applicant: FINGERPRINT CARDS ANACATUM IP AB, Gothenburg (SE)

(72) Inventors: Troels Bjerre, Valby (DK); Peter Bjørn-Jørgensen, Roskilde (DK)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 0 days.

(21) Appl. No.: 17/918,373

(22) PCT Filed: Apr. 29, 2021

(86) PCT No.: PCT/SE2021/050392
§ 371 (c)(1),
(2) Date: Oct. 12, 2022

(87) PCT Pub. No.: WO2021/221553
PCT Pub. Date: Nov. 4, 2021

(65) Prior Publication Data
US 2023/0147169 A1    May 11, 2023

(30) Foreign Application Priority Data
Apr. 30, 2020    (SE) .................................. 2050494-0

(51) Int. Cl.
*G06V 40/12*    (2022.01)
*G06T 7/246*    (2017.01)
*G06V 40/60*    (2022.01)
*G06V 40/50*    (2022.01)

(52) U.S. Cl.
CPC .......... *G06V 40/1335* (2022.01); *G06T 7/246* (2017.01); *G06V 40/1365* (2022.01); *G06V 40/50* (2022.01); *G06V 40/67* (2022.01)

(58) Field of Classification Search
CPC ............... G06T 7/246; G06V 40/1335; G06V 40/1365; G06V 40/50; G06V 40/67
See application file for complete search history.

(56) References Cited

U.S. PATENT DOCUMENTS

| 9,152,842 | B2 | 10/2015 | Vieta et al. |
| 2003/0123714 | A1 | 7/2003 | O'Gorman et al. |
| 2003/0179910 | A1 | 9/2003 | Wong |
| 2005/0105782 | A1 | 5/2005 | Abiko |
| 2005/0129291 | A1 | 6/2005 | Boshra |

(Continued)

OTHER PUBLICATIONS

International Search Report and Written Opinion for International Application No. PCT/SE2021/050392, dated Jun. 29, 2021.

*Primary Examiner* — Premal R Patel
(74) *Attorney, Agent, or Firm* — Westman, Champlin & Koehler, P.A.

(57) ABSTRACT

Method for forming an enrolled fingerprint template for a user of a fingerprint touch sensor. The method comprising: during a touch event in which a finger of the user is placed on the fingerprint sensor, capturing a plurality of images of the finger and comparing two of the images to determine if there is a valid transformation. If there is no valid transformation, images are compared against image quality and coverage thresholds to determine if any of the captured images are to be used for enrollment.

14 Claims, 6 Drawing Sheets

(56) References Cited

U.S. PATENT DOCUMENTS

| | | |
|---|---|---|
| 2005/0244039 A1 | 11/2005 | Geoffroy et al. |
| 2008/0205714 A1 | 8/2008 | Benkley et al. |
| 2010/0002914 A1 | 1/2010 | Abiko |
| 2010/0040306 A1 | 2/2010 | Morioka et al. |
| 2015/0074615 A1 | 3/2015 | Han et al. |
| 2016/0180141 A1 | 6/2016 | Sarve et al. |
| 2016/0234430 A1* | 8/2016 | Setterberg .............. G06V 40/50 |
| 2016/0253544 A1 | 9/2016 | Weber et al. |
| 2016/0292490 A1* | 10/2016 | Cheng .................... G06V 40/50 |
| 2017/0091523 A1 | 3/2017 | Chen et al. |
| 2018/0005014 A1 | 1/2018 | Chen et al. |
| 2018/0005394 A1 | 1/2018 | Russo et al. |
| 2018/0197298 A1 | 7/2018 | Chiang et al. |
| 2019/0080145 A1* | 3/2019 | Son .................... G06V 40/1335 |

\* cited by examiner

METHOD AND SYSTEM FOR ENROLLING A FINGERPRINT

CROSS-REFERENCE TO RELATED APPLICATION

This Application is a Section 371 National Stage Application of International Application No. PCT/SE2021/050392, filed Apr. 29, 2021, which claims priority to Swedish Patent Application No. 2050494-0 filed on Apr. 30, 2020, and published as WO 2021/221553 A1 on Nov. 4, 2021, in English, the entire contents of which are hereby incorporated by reference in their entireties.

FIELD OF THE INVENTION

The present invention relates to a method and system for enrolling a fingerprint of a user of a fingerprint sensor. In particular, the present invention relates to a method and system for increasing the quality of an enrolled fingerprint template.

BACKGROUND OF THE INVENTION

Various types of biometric systems are used more and more in order to provide for increased security and/or enhanced user convenience.

In particular, fingerprint sensing systems have been adopted in, for example, consumer electronic devices, thanks to their small form factor, high performance, and user acceptance.

To save cost and valuable surface space, and to increase the number of possible applications, there is an effort towards smaller and smaller fingerprint sensors, which may be substantially smaller than the user's fingerprint.

Accordingly, fingerprint sensing systems employing small sensors for stationary finger placement are more frequently used. In such fingerprint sensing systems, the user may be authenticated against an enrolled fingerprint representation (often referred to as a template) based on a single partial fingerprint image from the sensor.

For achieving the desired satisfactory biometric performance when authenticating based on a single partial fingerprint image from a small fingerprint sensor, it may be necessary that the enrolled template corresponds to a considerably larger portion of the user's fingerprint than the partial fingerprint image captured in connection with an authentication attempt. Therefore, it is common that an enrollment comprises capturing multiple partial fingerprint images which has the advantage that enrollment and authentication is carried out using the same electronic device, such as a mobile communication device.

However, for a small sensor only capturing a portion of the finger, it becomes increasingly important that the enrolled template is of good quality, since a template of too low quality may result in a too high false reject rate. Accordingly, it is desirable to improve the quality of the template.

SUMMARY

In view of above-mentioned and other drawbacks of the prior art, it is an object of the present invention to provide an improved method and system for enrolling a user of a fingerprint touch sensor.

According to a first aspect of the invention, there is provided a method for forming an enrolled fingerprint template for a user of a fingerprint touch sensor. The method comprises: during a touch event in which a finger of the user is placed on the fingerprint sensor, capturing a plurality of images of the finger; comparing two of the plurality of images to determine if there is a valid transformation between fingerprint feature pairs for the two images; determining that there is no valid transformation between the fingerprint feature pairs; for each image, determining a first image parameter indicative of image quality; for each image, determining a second image parameter indicative of sensor coverage; and when both of the first and second image parameters are above a corresponding first and second threshold value for both of the two images, rejecting the plurality of images; when the first and second image parameters are above a corresponding first and second threshold value for the first image, and at least one of the first and second image parameters are below a corresponding first and second threshold value for the second image, accept the first image for enrollment and reject the second image; and when at least one of the first and second image parameters are below a corresponding first and second threshold value for both images, reject both of the first and second images.

The fingerprint sensor may, for example, be a capacitive fingerprint sensor detecting a measure indicative of the capacitive coupling between each sensing element in an array of sensing elements and a finger surface touching the sensor surface. Sensing elements at locations corresponding to ridges in the fingerprint will exhibit a stronger capacitive coupling to the finger than sensing elements at locations corresponding to valleys in the fingerprint. The fingerprint sensor may also be an optical sensor comprising an array of photodetector configured to form a fingerprint image, or an ultrasonic sensor comprising ultrasonic transducers.

A touch event is here defined as one continuous event where the finger is in contact with the fingerprint sensor in a way such that a fingerprint image can be captured. Accordingly, if the finger is lifted or otherwise removed from the fingerprint sensor, the touch event is ended. Thereby, the plurality of images captured during the touch event is ideally identical, given that the finger does not move laterally or that the pressure of the finger on the sensing surface is constant during the touch event. However, in a practical application, it is more likely that the finger may move slightly and also that the force with which the finger is pressed against the surface may change during the touch event.

A geometric transformation between two images maps coordinate points in one image to corresponding coordinate points in the other image. For this to be possible, there needs to be some degree of overlap between the two images. Thereby, in order to determine if a valid transform exists, a certain number of extracted image features from a first image must match extracted features from the second image. There are a number of methods for image registration known to the skilled person. In principle, a transformation between two images can be considered to be valid if a known measure of similarity for a given transformation is above a predetermined threshold. Moreover, without a valid transformation of fingerprint features, it may be difficult or impossible to determine a finger movement between images.

The measure of Image quality can be based on a measure of (average) local image contrast. It must be possible to distinguish ridges and valleys in the images which requires a certain contrast. For example, if a finger is wet and placed on a capacitive sensor, the local image contrast could be very poor due to high capacitive coupling of both ridges and valleys.

Sensor coverage describes how large a proportion of the sensor is covered by a finger. Usually, it is not desirable to use images where the sensor is not close to being fully covered for enrollment. This is to make sure that the images can be used to form template which can be used for authentication after enrollment.

The present invention is based on the realization that for captured images where there is no valid transformation of features between two images, there may still be images which can be used for enrolment. To address this, the claimed method facilitates identifying such images.

Moreover, it is desirable to detect images captured during enrollment where the finger has moved more than a predetermined threshold in order to have the option to not use such images when forming an enrolled fingerprint template. It has been found that a template based on images resulting from capture events with excessive finger movement may give rise to a higher number of false negatives, i.e. fingerprint authentications where the correct fingerprint is appropriately captured but where the subsequent authentication fails.

To detect fingerprint movement, at least two images are captured and compared. The number of images to be captured during a touch event can for example be decided based on the capture speed of the fingerprint sensor. A finger may move, rub, slide, glide, or exhibit any other motion that may deform the fingerprint during image capture. Accordingly, the predetermined movement threshold can be set based on parameters such as fingerprint sensor resolution and other parameters determining what would be an allowable movement while still achieving images of sufficient quality.

By classifying all of the images from a touch event with a finger movement exceeding the threshold finger movement, such images are easily identifiable in later image processing and template formation steps, and it can be decided at a later stage how the so classified images are treated as will be described in the following.

According to one embodiment of the invention, the method may further comprise, if the finger movement exceeds the predetermined movement threshold, using at least one of the captured images from the touch event classified as resulting from a touch event with excessive finger movement to form an enrolled fingerprint template without providing an indication to the user that the enrolment process has progressed. Even if the finger movement exceeds the movement threshold, there may be usable information in one or more of the plurality of captured images. It is thereby not strictly required that all of the images from a touch event is discarded even if a finger movement exceeding the threshold movement is detected.

If the finger movement does not exceed the predetermined movement threshold, at least one of the plurality of images may be selected to form part of an enrolled fingerprint template. That the finger movement does not exceed the threshold movement is an indication that the captured image is suitable for use in forming a template.

According to one embodiment of the invention, determining a finger movement may comprise comparing at least two of the plurality of images to determine if there is a valid transformation between the fingerprint feature pairs; and if there is no valid transformation between the fingerprint feature pairs, discarding all of the images from the touch event such that they do not form part of an enrolled fingerprint template.

Determining a finger movement may comprise determining a finger movement between two consecutively captured images. It would in principle be possible to determine a finger movement between any two captured images. However, an advantage of using two consecutively captured images is that the same movement threshold can be used for all comparisons, at least as long as it can be assumed that the time between consecutive image captures is constant between different touch events.

According to one embodiment of the invention, the method may further comprise, if the finger movement exceeds the predetermined movement threshold, providing a notification to the user that the finger movement is inappropriate and that the finger should be held still on the sensor. The notification may be a visual, audio, or haptic notification or any combination thereof serving the purpose of letting the user know that the behavior is inappropriate and that the finger should be kept still during following touch events.

The above described embodiments relating to enrollment may also be implemented to detect finger movement during authentication, with appropriate modifications as needed. Accordingly, effects and features of the second aspect of the invention are largely analogous to those described above in connection with the first aspect of the invention According to a second aspect of the invention, there is provided a fingerprint sensing device comprising:

The described fingerprint sensing device is advantageously integrated in a user device such as a smartphone, computer, tablet, laptop or the like. However, many different applications of the fingerprint sensing device are feasible, such as smartcards, vehicle, door locks etc.

The user device further comprises means for providing a notification to a user that a finger movement is inappropriate. In a user device comprising a display, suitable information may be provided to the user on the display. The user device may also comprise e.g. a speaker and/or haptic elements for providing haptic feedback such as a vibration to the user.

Additional effects and features of the second aspect of the invention are largely analogous to those described above in connection with the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the system and method according to the present invention are mainly described with reference to a fingerprint sensor integrated in a smartphone. However, the described embodiments may equally well be implemented in a wide range of different applications.

Figure 1:
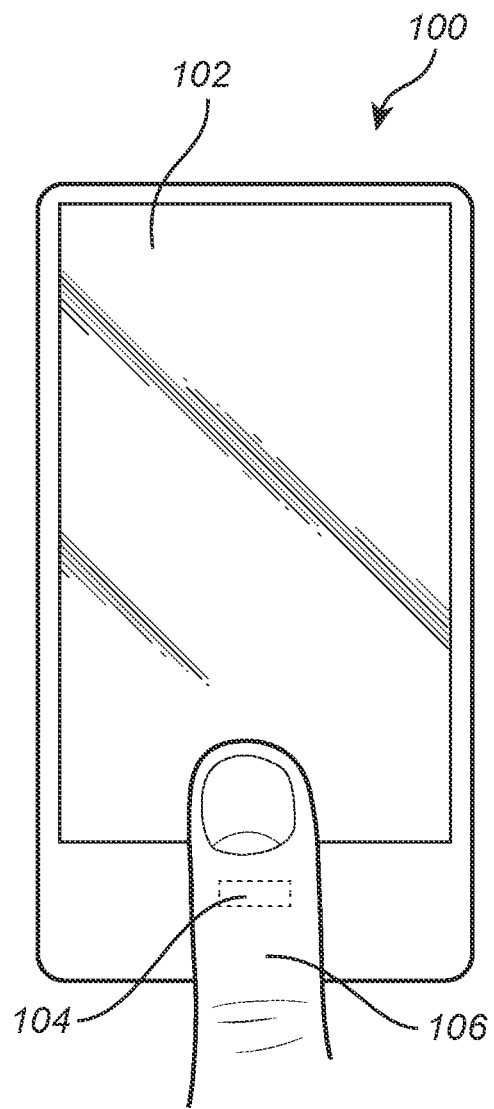
FIG. 1 schematically illustrates a fingerprint sensing device according to an embodiment of the invention.

Referring first to FIG. 1, a fingerprint enrollment system 100, here shown as being included in a smartphone 102 comprising a touch display 102 and a fingerprint sensor 104. The touch display 102 comprises a touch sensor for touch-based control of the smartphone and a display acting as a user communication interface. The fingerprint sensor 104 is considerably smaller than the total fingerprint of the user and is elongated with an exemplary aspect ratio of about 1:3. In FIG. 1, the user of the smartphone has placed a finger 106 on the fingerprint sensor 104 for enrolling the fingerprint.

The fingerprint sensor 104 comprises a sensing surface configured to be touched by a finger of a user, and a fingerprint sensor control unit (not shown) configured to perform various steps of the method according to embodiments of the invention. The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

Even though the illustrated sensor is a narrow sensor, the described method is applicable for any type of sensor. For back-mounted sensors there is usually an indentation around the sensor which makes the finger less likely to slide. However, an indentation is typically not present for a side-mounted slim sensor, increasing the risk that the finger may move during a touch event. The described method and system is also relevant for a fingerprint sensor integrated in a smart card where the sensor surface may be arranged in the surface plane of the card, i.e. without an indentation. In all implementations, the fingerprint sensor is a touch sensor configured to capture an image of finger held still on the fingerprint sensor.

Figure 2:
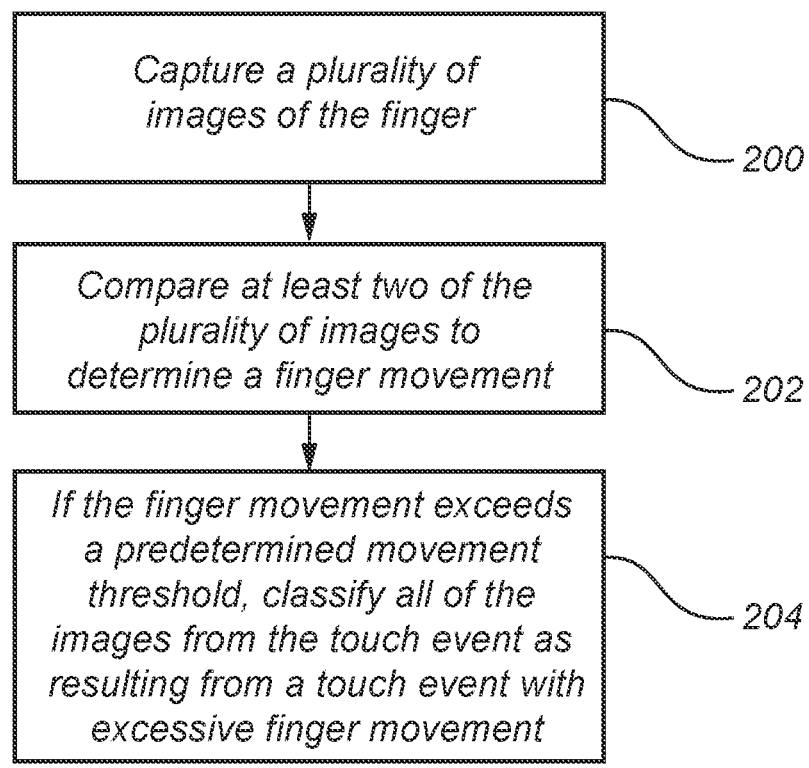
FIG. 2 is a flow chart outlining general steps of a method performed by the fingerprint sensing device.
Figure 3:
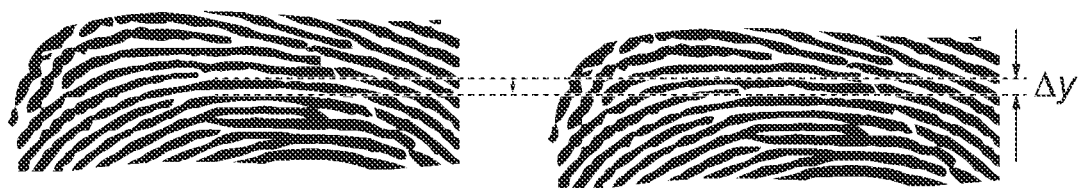
FIG. 3 schematically illustrates features of a method according to an embodiment of the invention.

The steps of a method according to an example implementation are outlined in the flow chart of FIG. 2, and the method will be described with reference to the fingerprint enrollment system illustrated in FIG. 1, and with further reference to FIG. 3 schematically illustrating fingerprint images captured during a touch event.

The method for forming an enrolled fingerprint template for a user of a fingerprint sensor comprises, during a touch event in which a finger of the user is placed on the fingerprint sensor, capturing 200 a plurality of images of the finger.

Next, at least two of the plurality of images are compared 202 to determine a finger movement during the touch event. In the example illustrated in FIG. 3, two images 300, 302 are illustrated where a shift in the vertical direction, $\Delta y$, can be observed between the two images. The two images 300, 302 may be consecutively captured images, or there may be other images captured between the two illustrated images 300, 302. Accordingly, in the illustrated example the finger movement is described by the movement in the y-direction, $\Delta y$.

If the finger movement exceeds a predetermined movement threshold, all of the images from the touch event are classified 204 as resulting from a touch event with excessive finger movement. In the present example, the finger has only moved in the y-direction. It is equally possible that the finger moves in the x-direction, or diagonally combining movement in the x- and y-directions, and the threshold may be defined as an absolute threshold value irrespective of movement direction, or separate thresholds may be set for the x- and y-direction respectively.

Moreover, in an example where three images are captured during a capture event, the comparison may comprise first comparing the $1^{st}$ and $2^{nd}$ images, and if the threshold is exceeded, comparing the $2^{nd}$ and $3^{rd}$ images. If the threshold is not exceeded in the comparison between the $2^{nd}$ and $3^{rd}$ images, the touch event may be seen as a successful touch event where either of the $2^{nd}$ or $3^{rd}$ image may be used to form a template. It would also be possible to compare the $1^{st}$ and $3^{rd}$ images, in which case the threshold movement may be adapted based on the time between the two captured images.

In an example implementation of a capacitive fingerprint sensor, the movement threshold between consecutive images may be in the range of 10-20 pixels, and with a pixel size of 0.05 mm this gives an acceptable finger movement velocity in the range of 1.25-5 cm/second. Thereby, if the finger moves faster than the maximum allowable velocity, the movement threshold will be exceeded.

In one example, the method may further comprise discarding all of the images classified as resulting from a touch event with excessive finger movement such that they do not form part of an enrolled fingerprint template. However, it would also be possible to use at least one of the captured images from touch event for a template even if excessive finger movement was detected. An image from such an event may still have a good quality and thereby being able to contribute to the template when combined with other images from other touch events.

Different scenarios are feasible for determining whether to use images classified as resulting from a touch event with excessive finger movement or not. If there is a sufficient number of good images for forming a fingerprint template without using the classified images, only the good images may be used and the images with excessive movement can be discarded.

The decision to discard or use images classified as resulting from a touch event with excessive finger movement may also be predetermined for a given application. For a large data set, e.g. for a large number of empirical enrollments and subsequent authentications, it can be determined if the inclusion of images with excessive finger movement decreases the overall false reject ratio without increasing the false accept ratio, and if so, the images may be included in the template. The resulting overall false reject ratio and false accept ratio with and without images with excessive finger movement may for example depend on properties of the fingerprint sensor and of the algorithms used for enrollment and authentication. Accordingly, it may not be possible to know beforehand if the classified images need to be discarded or not for a given application.

Figure 4:
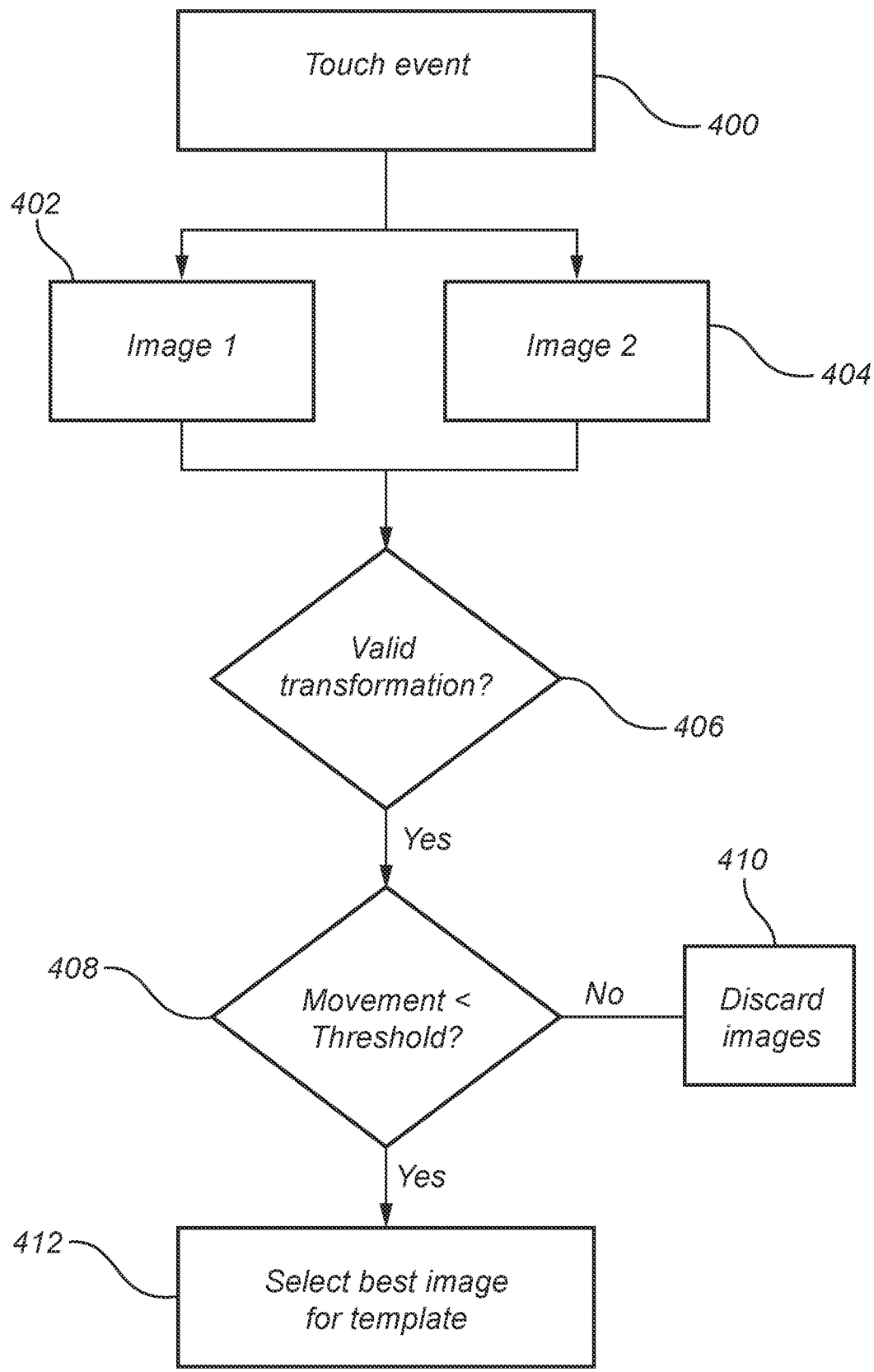
FIG. 4 is a flow chart outlining general steps of a method according to an embodiment of the invention.

FIG. 4 is a flow chart illustrating an example implementation where feature transformation and image quality is taken into account in addition to the detected finger movement. The method comprises, during a touch event 400, capturing two images 402, 404, and comparing 406 the two of the plurality of images to determine if there is a valid transformation between the feature pairs. A valid transformation between fingerprint representations in principle means that there can be established correspondence between the same subset of fingerprint features in the first image 402 and in the second image 404. A fingerprint feature in the first image and the corresponding feature in the second image is commonly termed a feature pair. The transformation offset, angle and rotation map the feature coordinates in the second image into the reference coordinate system of the first image. If there is no overlap between the partial fingerprint images, there will be no correspondence between fingerprint features in the first and second image, hence there will be no valid transformation which maps the fingerprint features in the first image to corresponding fingerprint features in the second image. Similarly, if the image quality of either the first image or the second image is poor, it might not be possible to establish correspondence between fingerprint features in the images.

If there is no valid transformation between feature pairs, it may be because the finger has moved a larger distance than the width/height of the image between captures, there is no overlap between the images, and thus no valid transformation between feature pairs. Thereby, it is not possible to determine a finger movement between the two images and the images from the touch event with no valid transformation may be discarded such that they do not form part of an enrolled fingerprint template.

If there is a valid transformation, the method moves on to the previously described step of determining 408 if the finger movement exceeds a predetermined movement threshold. If the finger movement exceeds a predetermined movement threshold, the images from that touch event may be discarded 410.

For a finger movement below the movement threshold, the best image is selected 412 for use in forming the fingerprint template. It can be determined which image is the best image based on conventional quality measures of the image. Moreover, the best image may be any image from the touch event, even if it has not used for the comparison when determining finger movement.

The method may also comprise determining a quality of captured images for a touch event and deciding to discard one or more images from a touch event if the quality is lower than a predetermined quality threshold.

Figure 5A:
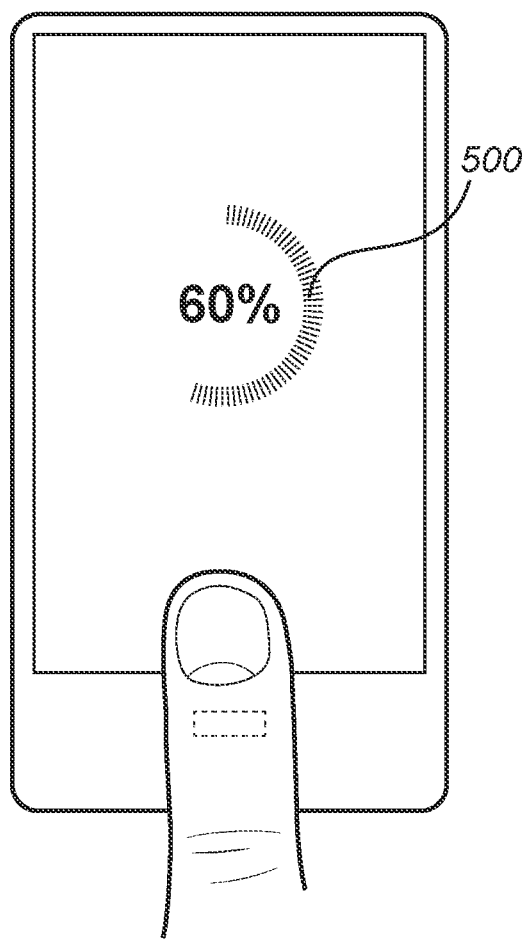
FIGS. 5A-B schematically illustrate features of a system and method according to embodiments of the invention.
Figure 5B:
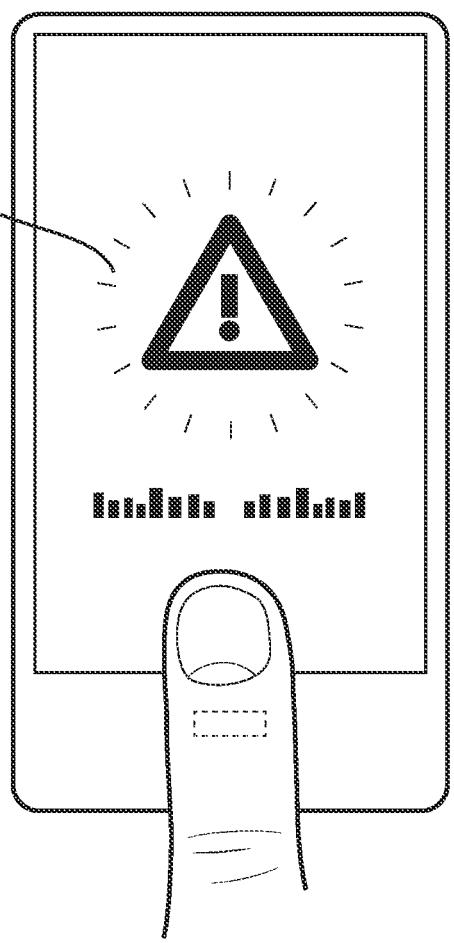

FIG. 5A schematically illustrates a smartphone where, if the finger movement does not exceed the predetermined movement threshold, an indication 500 is provided to the user that the enrolment process has progressed. The indication may be in the form of a counter illustrating a completion percentage, thereby encouraging the user to continue with the same behavior in terms of finger movement also for following touch events. In FIG. 5B, it illustrated that if the finger movement exceeds the predetermined movement threshold, a notification 502 is provided to the user that the finger movement is inappropriate. The notification may be in the form of a flashing warning with an appropriate instructive text, and the notification may also be accompanied by a sound and/or a vibration.

Figure 6:
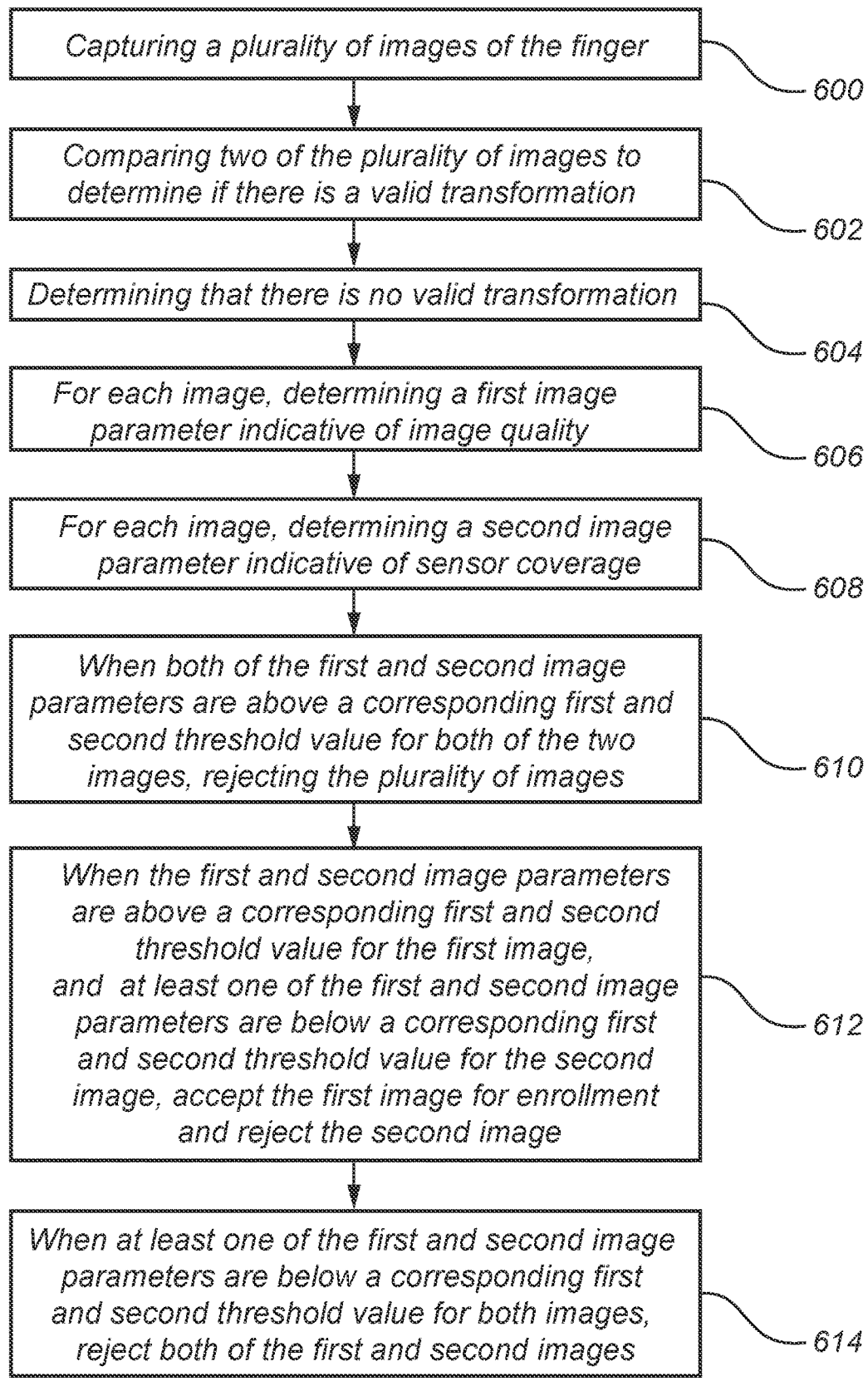
FIG. 6 is a flow chart outlining general steps of a method according to an embodiment of the invention.
Figure 7:
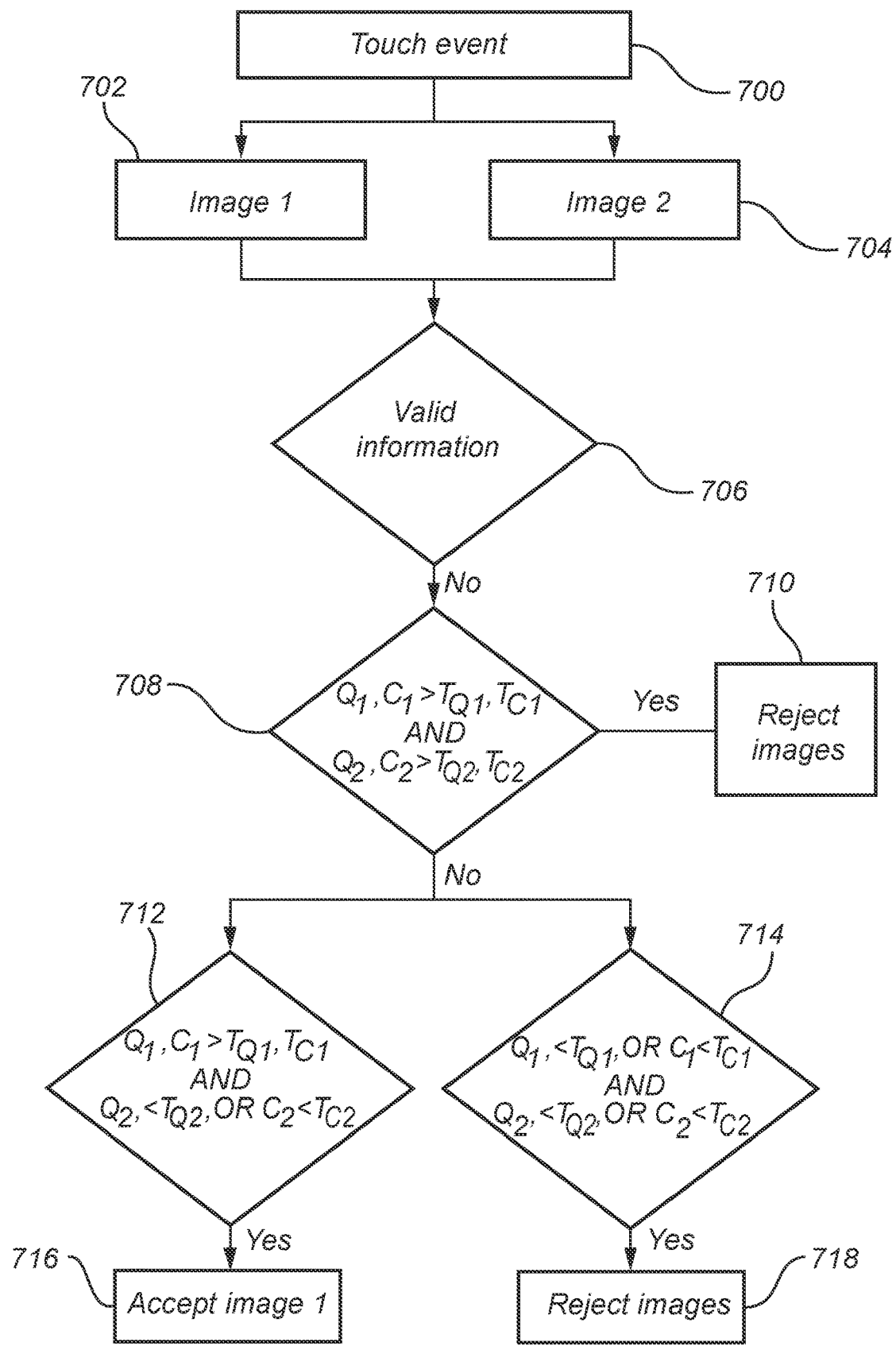
FIG. 7 is a block diagram describing steps of a method according to an embodiment of the invention.

FIG. 6 is a flow chart describing steps of a method according to an embodiment of the invention and Fig. is a block diagram illustrating features of the method. The method described by FIGS. 6 and 7 is aimed at the scenario where there is no valid transformation between fingerprint feature pairs for two images. It will be shown that even if there is no valid transformation, there may be images which can be used for enrollment. Thereby, the enrollment process can be improved since more images can potentially be used for enrollment if they fulfill the requirements that will be described in the following.

During a touch event 700 in which a finger of the user is placed on the fingerprint sensor 104, the method comprises capturing 600 a plurality of images 702, 704 of the finger.

The next step comprises comparing 602 two of the plurality of images to determine if there is a valid transformation 706 between fingerprint feature pairs for the two images. The present method is based on the scenario where it is determined 604 that there is no valid transformation between the fingerprint feature pairs. Moreover, even though the method is described with reference to two captured images, image 1 and image 2, the method may equally well be applied when a larger number of images is captured.

Next, for each image, a first image parameter indicative of image quality, $Q_1$, $Q_2$, and a second image parameter indicative of sensor coverage $C_1$, $C_2$, is determined 606, 608

When both of the first and second image parameters $Q_1$, $Q_2$, $C_1$, $C_2$, are above a corresponding first and second threshold value ($T_{Q1}$, $T_{Q2}$, $T_{C1}$, $T_{C1}$) 708 for both of the two images 610, the plurality of images are rejected 710. In other words when $Q_1 > T_{Q1}$, $C_1 > T_{C1}$, $Q_2 > T_{Q2}$, and $C_2 > T_{C2}$, the images are rejected. It may seem counterintuitive to reject images when both quality and coverage are above the required threshold values. However, for such a scenario where both quality and coverage is good, there should also have been a valid transformation if there was an overlap between images. Therefore, it is assumed that the images are non-overlapping and the images are rejected.

When 612 the first and second image parameters are above a corresponding first and second threshold value for the first image, and at least one of the first and second image parameters are below a corresponding first and second threshold value for the second image 712, the first image is accepted 716 for enrollment and the second image is rejected. The scenario can also be described as $Q_1$, $C_1 > T_{Q1}$, $T_{C1}$ AND ($Q_2$, $< T_{Q2}$, OR $C_2 < T_{C2}$). In this scenario, it cannot be determined if there is overlap or not because either quality or coverage is not high enough. Possibly, the finger was lifted too quickly and only a single image was captured. In lack of data, it is selected to accept the image exceeding the quality and coverage thresholds. It should be noted that the "first" image may be any image in the sequence of images. In other words, if any one of the captured images fulfills the requirements, it may be selected for use in an enrolment template.

When 614 at least one of the first and second image parameters are below a corresponding first and second threshold value for both images 714, reject 718 both of the first and second images. In other words, if either quality or coverage is below the threshold for both images, both images are rejected, which can also be described as ($Q_1$, $< T_{Q1}$, OR $C_1 < T_{C1}$) AND ($Q_2$, $< T_{Q2}$, OR $C_2 < T_{C2}$).

According to one embodiment of the invention, determining that there is no valid transformation between the fingerprint feature pairs comprises determining that a number of extracted image features from the first image matching extracted image features of the second image is below a predetermined threshold value.

According to one embodiment of the invention, determining a first image parameter indicative of image quality comprises determining an image contrast of at least a portion of the image.

According to one embodiment of the invention, determining a second image parameter indicative of sensor coverage comprises determining the portion of the sensor being covered by a finger.

Even though the invention has been described with reference to specific exemplifying embodiments thereof, many different alterations, modifications and the like will become apparent for those skilled in the art. Also, it should be noted that parts of the method and system may be omitted, interchanged or arranged in various ways, the method and system yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. Method for forming an enrolled fingerprint template for a user of a fingerprint touch sensor, the method comprising:
   during a touch event in which a finger of the user is placed on the fingerprint sensor, capturing a plurality of images of the finger;
   comparing two of the plurality of images to determine if there is a valid transformation between fingerprint feature pairs for the two images;
   determining that there is no valid transformation between the fingerprint feature pairs;
   for each image, determining a first image parameter indicative of image quality;
   for each image, determining a second image parameter indicative of sensor coverage; and
   when both of the first and second image parameters are above a corresponding first and second threshold value for both of the two images, rejecting the plurality of images;
   when the first and second image parameters are above a corresponding first and second threshold value for the first image, and at least one of the first and second image parameters are below a corresponding first and second threshold value for the second image, accept the first image for enrollment and reject the second image; and
   when at least one of the first and second image parameters are below a corresponding first and second threshold value for both images, reject both of the first and second images.

2. The method according to claim 1, wherein determining that there is no valid transformation between the fingerprint feature pairs comprises determining that a number of extracted image features from the first image matching extracted image features of the second image is below a predetermined threshold value.

3. The method according to claim 1, wherein determining a first image parameter indicative of image quality comprises determining an image contrast of at least a portion of the image.

4. The method according to claim 1, wherein determining a second image parameter indicative of sensor coverage comprises determining the portion of the sensor being covered by a finger.

5. The method according to claim 1, further comprising:
   comparing at least two of the plurality of images to determine a finger movement during the touch event; and
   if the finger movement exceeds a predetermined movement threshold,
   classifying all of the images from the touch event as resulting from a touch event with excessive finger movement.

6. The method according to claim 5, further comprising, if the finger movement exceeds the predetermined movement threshold, using at least one of the captured images from the touch event classified as resulting from a touch event with excessive finger movement to form an enrolled fingerprint template without providing an indication to the user that the enrolment process has progressed.

7. The method according to claim 5, wherein determining a finger movement comprises:
   comparing at least two of the plurality of images to determine if there is a valid transformation between fingerprint feature pairs; and
   if there is no valid transformation between the fingerprint feature pairs, discarding all of the images from the touch event such that they do not form part of an enrolled fingerprint template.

8. The method according to claim 5, further comprising, if the finger movement exceeds the predetermined movement threshold, providing a notification to the user to encourage the user to hold the finger still.

9. A fingerprint sensing device comprising:
   a fingerprint touch sensor having a sensing surface configured to be touched by a finger of a user; and
   a fingerprint sensor control unit configured to:
   during a touch event in which a finger of the user is placed on the fingerprint sensor, capturing a plurality of images of the finger;
   comparing two of the plurality of images to determine if there is a valid transformation between fingerprint feature pairs for the two images;
   determining that there is no valid transformation between the fingerprint feature pairs;
   for each image, determining a first image parameter indicative of image quality;
   for each image, determining a second image parameter indicative of sensor coverage; and
   when both of the first and second image parameters are above a corresponding first and second threshold value for both of the two images, rejecting the plurality of images;
   when the first and second image parameters are above a corresponding first and second threshold value for a first image, and at least one of the first and second image parameters are below a corresponding first and second threshold value for a second image, accept the first image for enrollment and reject the second image; and
   when at least one of the first and second image parameters are below a corresponding first and second threshold value for both images, reject both of the first and second images.

10. The fingerprint sensing device according to claim 9, wherein determining that there is no valid transformation between the fingerprint feature pairs comprises determining that a number of extracted image features from the first image matching extracted image features of the second image is below a predetermined threshold value.

11. The fingerprint sensing device according to claim 9, wherein determining a first image parameter indicative of image quality comprises determining an image contrast of at least a portion of the image.

12. The fingerprint sensing device according to claim 9, wherein determining a second image parameter indicative of sensor coverage comprises determining the portion of the sensor being covered by a finger.

13. The fingerprint sensing device according to claim 9, wherein the sensing surface has a size which is adapted to capture an image corresponding to a partial fingerprint of a user.

14. A user device comprising a fingerprint sensing device according to claim 9.

\* \* \* \* \*